US012360983B2

United States Patent
Seiden et al.

(10) Patent No.: US 12,360,983 B2
(45) Date of Patent: Jul. 15, 2025

(54) LIVE EDITING EDITABLE TABLES

(71) Applicant: SIGMA COMPUTING, INC., San Francisco, CA (US)

(72) Inventors: Max H. Seiden, San Francisco, CA (US); Rodolphe Gagneron, San Diego, CA (US); Gregory G. Owen, San Mateo, CA (US)

(73) Assignee: SIGMA COMPUTING, INC., San Francisco, CA (US)

( * ) Notice: Subject to any disclaimer, the term of this patent is extended or adjusted under 35 U.S.C. 154(b) by 37 days.

(21) Appl. No.: 17/559,800

(22) Filed: Dec. 22, 2021

(65) Prior Publication Data

US 2023/0147424 A1  May 11, 2023

Related U.S. Application Data

(60) Provisional application No. 63/278,356, filed on Nov. 11, 2021.

(51) Int. Cl.
G06F 16/23 (2019.01)
G06F 16/21 (2019.01)
G06F 16/22 (2019.01)
G06F 16/2458 (2019.01)
G06F 16/25 (2019.01)
G06F 16/28 (2019.01)
G06F 21/62 (2013.01)

(52) U.S. Cl.
CPC ........ *G06F 16/2379* (2019.01); *G06F 16/219* (2019.01); *G06F 16/2282* (2019.01); *G06F 16/2474* (2019.01); *G06F 16/254* (2019.01); *G06F 16/283* (2019.01); *G06F 21/6227* (2013.01); *G06F 21/6245* (2013.01)

(58) Field of Classification Search
None
See application file for complete search history.

(56) References Cited

U.S. PATENT DOCUMENTS

| 6,480,857 | B1 | 11/2002 | Chandler |
| 7,509,332 | B1 | 3/2009 | Milby |
| 7,949,633 | B1 * | 5/2011 | Shaver .................. G06F 40/166 707/620 |

(Continued)

FOREIGN PATENT DOCUMENTS

WO  2023086504 A1  5/2023

OTHER PUBLICATIONS

International Search Report and Written Opinion, PCT/US2022/049594, Feb. 17, 2023, 14 pages.

*Primary Examiner* — Richard L Bowen

(57) ABSTRACT

Live editing editable tables including receiving, via a client computing system by a table manager on an intermediary computing system, a request for an editable table stored on a cloud-based data warehouse; determining, by the table manager, that the requested editable table includes an uncommitted edit, wherein the uncommitted edit is an edit made to the editable table that has not been committed to the cloud-based data warehouse; redirecting, by the table manager, the request for the editable table to an edit queue on the intermediary computing system, wherein the edit queue comprises the uncommitted edit; and servicing, by the table manager, the request for the editable table using the edit queue on the intermediary computing system.

18 Claims, 6 Drawing Sheets

(56) References Cited

U.S. PATENT DOCUMENTS

| | | |
|---|---|---|
| 8,006,174 B2 | 8/2011 | Aureglia et al. |
| 8,161,081 B2 | 4/2012 | Kaufman et al. |
| 8,375,011 B2 | 2/2013 | Fox et al. |
| 8,510,266 B1 | 8/2013 | Ho et al. |
| 8,676,772 B2 | 3/2014 | Gislason |
| 9,330,149 B2 | 5/2016 | Angrish et al. |
| 9,690,764 B1 | 6/2017 | Batni |
| 10,025,801 B2 | 7/2018 | Kaufman et al. |
| 10,140,352 B2 | 11/2018 | Hariharan et al. |
| 10,599,650 B2 | 3/2020 | Baeuerle et al. |
| 10,621,203 B2 | 4/2020 | Hunt et al. |
| 10,713,178 B2 | 7/2020 | Yen et al. |
| 10,885,051 B1 | 1/2021 | Peters et al. |
| 10,929,384 B2 | 2/2021 | Karunanithi et al. |
| 10,956,447 B2 | 3/2021 | Arnold et al. |
| 10,956,665 B1 | 3/2021 | Greenbaum et al. |
| 10,977,220 B2 | 4/2021 | Kaufman et al. |
| 10,990,571 B1 | 4/2021 | Zhang et al. |
| 11,100,101 B2 | 8/2021 | Zhao et al. |
| 11,137,987 B2 | 10/2021 | Namarvar et al. |
| 11,163,791 B2 | 11/2021 | Patel et al. |
| 11,216,422 B2 | 1/2022 | Cosic |
| 11,354,493 B2 | 6/2022 | Von Tish et al. |
| 11,443,110 B2 | 9/2022 | Davis et al. |
| 11,514,186 B2 | 11/2022 | Gandhi et al. |
| 11,636,408 B2* | 4/2023 | Sit .................. G06Q 10/06311 705/7.13 |
| 11,693,549 B2 | 7/2023 | Stojanovic et al. |
| 11,709,809 B1* | 7/2023 | Li ........................ G06F 16/219 707/695 |
| 2003/0177481 A1 | 9/2003 | Amaru et al. |
| 2003/0217033 A1 | 11/2003 | Sandler et al. |
| 2004/0088334 A1 | 5/2004 | Klein |
| 2004/0103365 A1 | 5/2004 | Cox |
| 2005/0097187 A1 | 5/2005 | Thompson et al. |
| 2007/0033518 A1 | 2/2007 | Kenna et al. |
| 2007/0043706 A1* | 2/2007 | Burke .................... G06F 16/951 |
| 2008/0016041 A1 | 1/2008 | Frost et al. |
| 2009/0276692 A1 | 11/2009 | Rosner |
| 2010/0100558 A1 | 4/2010 | Bakalash et al. |
| 2010/0211862 A1 | 8/2010 | Parish et al. |
| 2010/0262647 A1* | 10/2010 | Malek .................. H04L 67/1095 709/248 |
| 2010/0281372 A1* | 11/2010 | Lyons .................. G11B 27/034 715/720 |
| 2012/0311474 A1 | 12/2012 | McPherson et al. |
| 2014/0229424 A1 | 8/2014 | Gislason |
| 2015/0120687 A1 | 4/2015 | Bhattacharjee et al. |
| 2016/0162461 A1 | 6/2016 | Simon et al. |
| 2016/0321232 A1 | 11/2016 | Tan et al. |
| 2016/0321233 A1 | 11/2016 | He et al. |
| 2016/0378737 A1* | 12/2016 | Keslin .................. H04L 12/1822 715/753 |
| 2017/0277743 A1 | 9/2017 | Jain et al. |
| 2017/0286454 A1 | 10/2017 | Saeki et al. |
| 2018/0082289 A1 | 3/2018 | Johnson et al. |
| 2018/0096043 A1 | 4/2018 | Ledbetter et al. |
| 2018/0351781 A1* | 12/2018 | Movsisyan ............. H04L 67/10 |
| 2019/0095173 A1 | 3/2019 | Kaufman et al. |
| 2019/0095413 A1* | 3/2019 | Davis .................... H04L 67/565 |
| 2019/0206231 A1* | 7/2019 | Armstrong ............. G08B 25/10 |
| 2019/0294688 A1* | 9/2019 | Mohan .............. G06F 16/24552 |
| 2019/0392063 A1* | 12/2019 | Tosukhowong .... G06F 16/2365 |
| 2020/0034365 A1 | 1/2020 | Martin et al. |
| 2020/0150938 A1 | 5/2020 | Stachura |
| 2021/0081364 A1* | 3/2021 | Jiang ................. G06F 16/24561 |
| 2021/0081605 A1 | 3/2021 | Smith et al. |
| 2021/0149858 A1 | 5/2021 | Xia et al. |
| 2021/0192601 A1* | 6/2021 | Dandy ............... G06Q 30/0283 |
| 2021/0223947 A1 | 7/2021 | Stojanovic et al. |
| 2022/0043779 A1* | 2/2022 | Maddila .................. G06F 40/197 |
| 2023/0143272 A1 | 5/2023 | Seiden et al. |
| 2023/0145697 A1 | 5/2023 | Seiden et al. |
| 2023/0146077 A1 | 5/2023 | Seiden et al. |
| 2023/0147197 A1 | 5/2023 | Seiden et al. |
| 2023/0147424 A1 | 5/2023 | Seiden et al. |
| 2023/0195744 A1 | 6/2023 | Owen et al. |

* cited by examiner

US 12,360,983 B2

LIVE EDITING EDITABLE TABLES

CROSS-REFERENCE TO RELATED APPLICATIONS

This application is a non-provisional application for patent entitled to a filing date and claiming the benefit of earlier-filed U.S. Provisional Patent Application Ser. No. 63/278,356, filed Nov. 11, 2021, the contents of which are incorporated herein by reference in their entirety.

BACKGROUND

Field of the Invention

The field of the invention is data processing, or, more specifically, methods, apparatus, and products for live editing editable tables.

Description of Related Art

Modern businesses may store large amounts of data in remote databases within cloud-based data warehouses. This data may be accessed using database statement languages, such as structured query language (SQL). Manipulating the data stored in the database may require constructing complex queries beyond the abilities of most users. Further, composing and issuing database queries efficiently may also be beyond the abilities of most users.

SUMMARY

Methods, systems, and apparatus for live editing editable tables including receiving, via a client computing system by a table manager on an intermediary computing system, a request for an editable table stored on a cloud-based data warehouse; determining, by the table manager, that the requested editable table includes an uncommitted edit, wherein the uncommitted edit is an edit made to the editable table that has not been committed to the cloud-based data warehouse; redirecting, by the table manager, the request for the editable table to an edit queue on the intermediary computing system, wherein the edit queue comprises the uncommitted edit; and servicing, by the table manager, the request for the editable table using the edit queue on the intermediary computing system.

The foregoing and other objects, features and advantages of the invention will be apparent from the following more particular descriptions of exemplary embodiments of the invention as illustrated in the accompanying drawings wherein like reference numbers generally represent like parts of exemplary embodiments of the invention.

DETAILED DESCRIPTION

Figure 1:
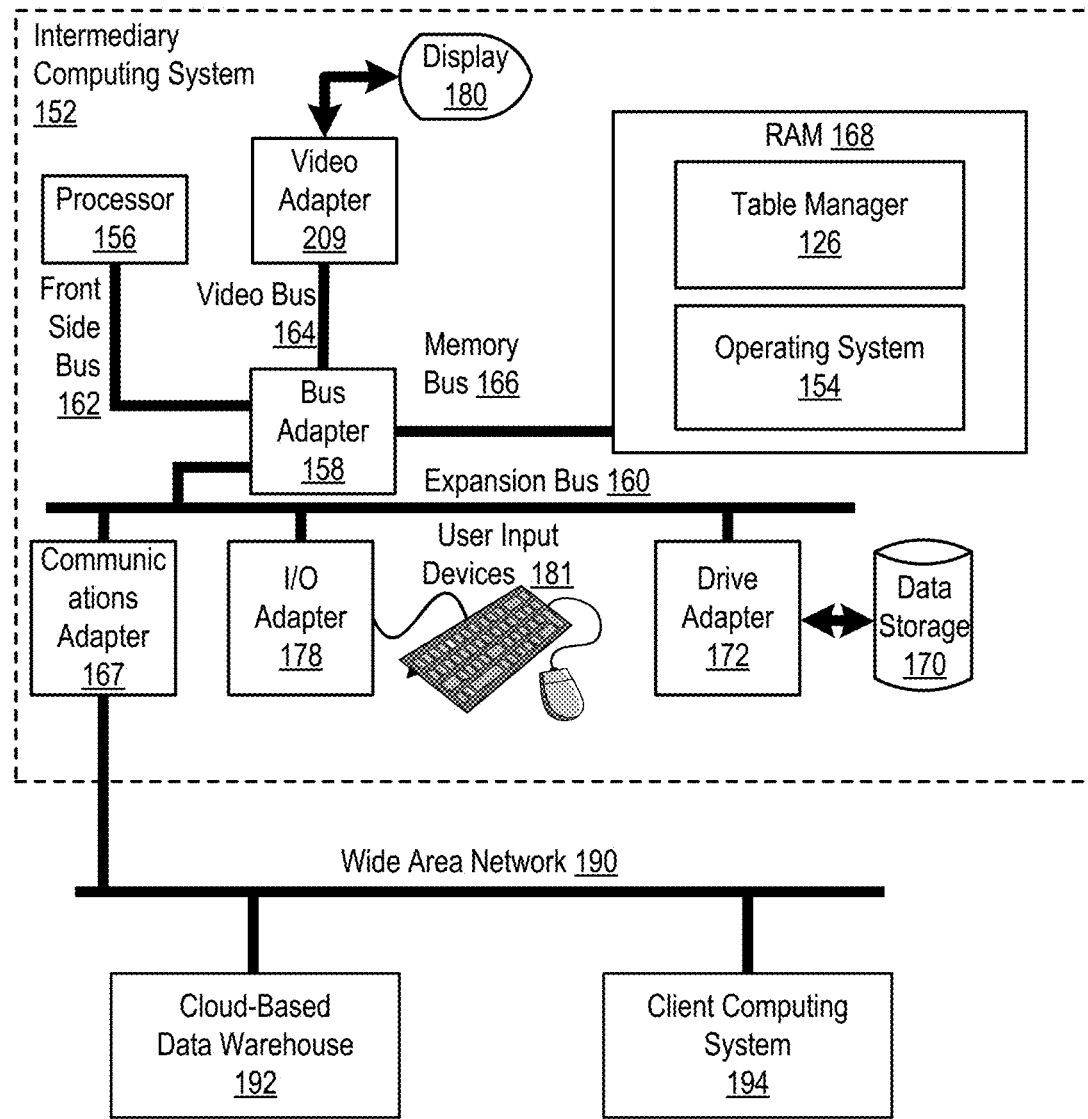
FIG. 1 sets forth a block diagram of an example system configured for live editing editable tables according to embodiments of the present invention.

Exemplary methods, apparatus, and products for live editing editable tables in accordance with the present invention are described with reference to the accompanying drawings, beginning with FIG. 1. FIG. 1 sets forth a block diagram of automated computing machinery comprising an exemplary intermediary computing system 152 configured for live editing editable tables according to embodiments of the present invention. The intermediary computing system 152 of FIG. 1 includes at least one computer processor 156 or 'CPU' as well as random access memory 168 ('RAM') which is connected through a high speed memory bus 166 and bus adapter 158 to processor 156 and to other components of the intermediary computing system 152.

Stored in RAM 168 is an operating system 154. Operating systems useful in computers configured for live editing editable tables according to embodiments of the present invention include UNIX™, Linux™, Microsoft Windows™, AIX™, and others as will occur to those of skill in the art. The operating system 154 in the example of FIG. 1 is shown in RAM 168, but many components of such software typically are stored in non-volatile memory also, such as, for example, on data storage 170, such as a disk drive. Also stored in RAM is the table manager 126, a module for live editing editable tables according to embodiments of the present invention.

The intermediary computing system 152 of FIG. 1 includes disk drive adapter 172 coupled through expansion bus 160 and bus adapter 158 to processor 156 and other components of the intermediary computing system 152. Disk drive adapter 172 connects non-volatile data storage to the intermediary computing system 152 in the form of data storage 170. Disk drive adapters useful in computers configured for live editing editable tables according to embodiments of the present invention include Integrated Drive Electronics ('IDE') adapters, Small Computer System Interface ('SCSI') adapters, and others as will occur to those of skill in the art. Non-volatile computer memory also may be implemented for as an optical disk drive, electrically erasable programmable read-only memory (so-called 'EEPROM' or 'Flash' memory), RAM drives, and so on, as will occur to those of skill in the art.

The example intermediary computing system 152 of FIG. 1 includes one or more input/output ('I/O') adapters 178. I/O adapters implement user-oriented input/output through, for example, software drivers and computer hardware for controlling output to display devices such as computer display screens, as well as user input from user input devices 181 such as keyboards and mice. The example intermediary computing system 152 of FIG. 1 includes a video adapter 209, which is an example of an I/O adapter specially designed for graphic output to a display device 180 such as a display screen or computer monitor. Video adapter 209 is connected to processor 156 through a high speed video bus 164, bus adapter 158, and the front side bus 162, which is also a high speed bus.

The exemplary intermediary computing system 152 of FIG. 1 includes a communications adapter 167 for data communications with other computers and for data communications with a data communications network. Such data communications may be carried out serially through RS-232 connections, through external buses such as a Universal Serial Bus ('USB'), through data communications networks such as IP data communications networks, and in other ways as will occur to those of skill in the art. Communications adapters implement the hardware level of data communications through which one computer sends data communications to another computer, directly or through a data communications network. Examples of communications adapters useful in computers configured for live editing editable tables according to embodiments of the present invention include modems for wired dial-up communications, Ethernet (IEEE 802.3) adapters for wired data communications, and 802.11 adapters for wireless data communications.

The communications adapter 167 is communicatively coupled to a wide area network 190 that also includes a cloud-based data warehouse 192 and a client computing system 194. The cloud-based data warehouse 192 is a computing system or group of computing systems that hosts a database or databases for access over the wide area network 190. The client computing system 194 is a computing system that accesses the database using the table manager 126.

Figure 2:
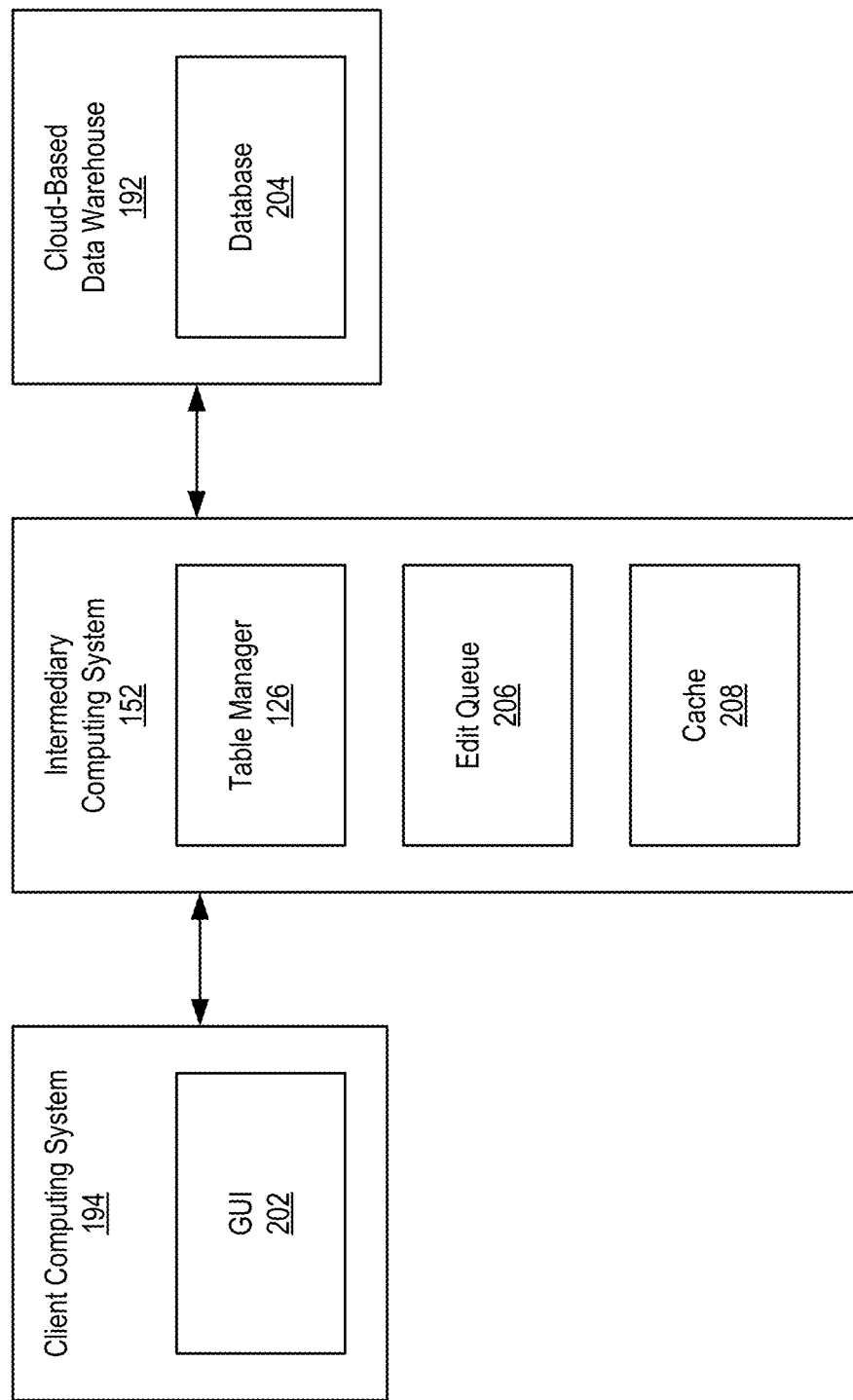
FIG. 2 sets forth a block diagram of an example system configured for live editing editable tables according to embodiments of the present invention.

FIG. 2 shows an exemplary system for live editing editable tables according to embodiments of the present invention. As shown in FIG. 2, the system includes a client computing system 194, an intermediary computing system 152, and a cloud-based data warehouse 192. The client computing system 194 includes a graphical user interface (GUI) 202. The intermediary computing system 152 includes a table manager 126, an edit queue 206, and a cache 208. The cloud-based data warehouse 192 includes a database 204. The client computing system 194 may access the cloud-based data warehouse 192 and database 204 via the table manager on the intermediary computing system 152.

The GUI 202 is a visual presentation configured to present data sets in the form of worksheets, workbooks, and graphical elements to a user. The GUI 202 also receives requests from a user for data sets from the database 204. The GUI 202 may also present to the user the ability to add a new row into a data set or table and enter values for each column of the new row. The GUI 202 may be presented, in part, by the table manager 126 and displayed on a client computing system 194 (e.g., on a system display or mobile touchscreen). The GUI 202 may be part of an Internet application that includes the table manager 126 and is hosted on the intermediary computing system 152.

The database 204 is a collection of data and a management system for the data. A data set is a collection of data (such as a table) from the database 204. Data sets may be organized into columns and rows (also referred to as records). The particular columns, rows, and organization of the columns and rows that make up a data set may be specified in the database statement requesting the data set. Data sets may be sent from the cloud-based data warehouse 192 in response to a database statement (also referred to as a query). Accordingly, data sets retrieved in response to a database statement may be referred to as query results.

The table manager 126 is hardware, software, or an aggregation of hardware and software configured to receive instructions in the form of state specifications from the client computing system 194, via the GUI 202. The table manager 126 is also configured to generate database statements in response to manipulations of the GUI 202 described in the state specification.

The state specification is a collection of data describing inputs into the GUI 202. The state specification may include manipulations of GUI elements within the GUI 202 along with data entered into the GUI 202 by a user of the client computing system 194. Such manipulations and data may indicate requests for and manipulations of data sets. Such manipulations and data may also indicate requests to create a new row and values for that new row. The state specification may be a standard file format used to exchange data in asynchronous browser-server communication. For example, the state specification may be a JavaScript Object Notation specification. The state specification may include descriptions of elements that are used to apply changes to the data set. Such elements may include filters applied to the worksheet, the hierarchical level of the worksheet, joins performed within the worksheet, exposable parameters in the worksheet, and security for the worksheet.

The table manager 126 uses the state specification as input to generate a database statement. This database statement generation process may begin with state specification being converted into an abstract syntax tree. The abstract syntax tree may then be canonicalized into a canonicalized hierarchy. The canonicalized hierarchy may then be linearized into the worksheet algebra. The worksheet algebra may then be lowered into a relational algebra, which may then be lowered into the database statement.

The table manager 126 may use the database statement to fetch query results (i.e., a data set) from the database 204. The table manager 126 may then present the query results to a user via the GUI 202. The table manager 126 may further manage tables on the database 202 to which a user has made edits, such as adding new rows or editing existing rows. Further, the table manager 126 may add columns to new rows and create new tables on the database 202.

The edit queue 206 is a repository for uncommitted edits made to an editable table. Edits in the edit queue 206 are sent to the database 204 on the cloud-based data warehouse 192 to be committed to the editable table. "Committed" as used herein refers to an edit to the editable table that has been accepted by the database 204 on the cloud-based data warehouse 192 and is currently reflected in query results from the database 204. Similarly, "uncommitted" as used herein refers to any edit that is not currently reflected in query results from the database 204. Note that an edit is still reflected in query results even if that edit has been deleted or overwritten by a later edit.

Edits may be sent individually or in batches to the database 204 on the cloud-based data warehouse 192. Further, edits stored in the edit queue 206 may be stored as database statements (e.g., as structured query language statements). Alternatively, the edits may be stored in an intermediate representation before being converted to a database statement and transmitted. Each uncommitted edit may be held in the edit queue 206 until a commitment acknowledgement for the uncommitted edit is received from the cloud-based data warehouse 192. The edit queue 206 may also include a mechanism to service requests from the table manager 126. Specifically, the edit queue 206 may include the ability to respond to requests from the table manager 126 and provide rows from the uncommitted edits in response.

The cache 208 is memory on the intermediary computing system that stores previous query results from the database 204 on the cloud-based data warehouse 192. The stored query results in the cache 208 may include all or portions of the editable table. The cache 208 is local to the table manager 126 in that both the cache 208 and the table manager 126 reside on the same system (i.e., the intermediary computing system).

Figure 3:
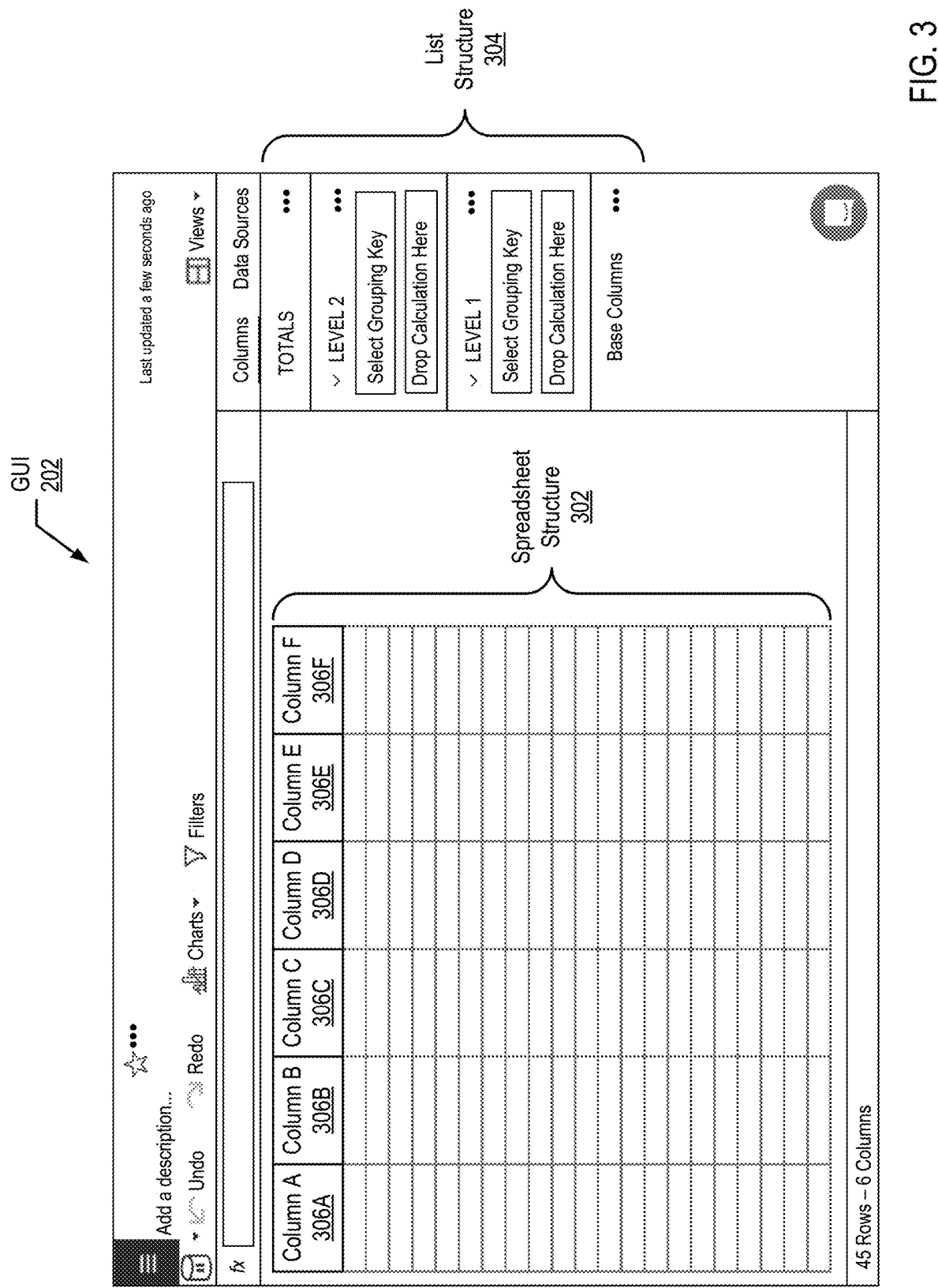
FIG. 3 sets forth a block diagram of an example system configured for live editing editable tables according to embodiments of the present invention.

FIG. 3 shows an exemplary system for live editing editable tables according to embodiments of the present invention. As shown in FIG. 3, the exemplary GUI 202 includes a spreadsheet structure 302 and a list structure 304. The spreadsheet structure 302 includes a worksheet (shown as empty rows) with six columns (column A 306A, column B 306B, column C 306C, column D 306D, column E 306E, column F 306F). The combination of a worksheet and dynamic graphic elements may be referred to as a workbook.

The spreadsheet structure 302 is a graphical element and organizing mechanism for a worksheet that presents a data set. A worksheet is a presentation of a data set (such as a table) from a database on a data warehouse. The spreadsheet structure 302 displays the worksheet as rows of data organized by columns (column A 306A, column B 306B, column C 306C, column D 306D, column E 306E, column F 306F). The columns delineate different categories of the data in each row of the worksheet. The columns may also be calculation columns that include calculation results using other columns in the worksheet.

The list structure 304 is a graphical element used to define and organize the hierarchical relationships between the columns (column A 306A, column B 306B, column C 306C, column D 306D, column E 306E, column F 306F) of the data set. The term "hierarchical relationship" refers to subordinate and superior groupings of columns. For example, a database may include rows for an address book, and columns for state, county, city, and street. A data set from the database may be grouped first by state, then by county, and then by city. Accordingly, the state column would be at the highest level in the hierarchical relationship, the county column would be in the second level in the hierarchical relationship, and the city column would be at the lowest level in the hierarchical relationship.

The list structure 304 presents a dimensional hierarchy to the user. Specifically, the list structure 304 presents levels arranged hierarchically across at least one dimension. Each level within the list structure 304 is a position within a hierarchical relationship between columns (column A 306A, column B 306B, column C 306C, column D 306D, column E 306E, column F 306F). The keys within the list structure 304 identify the one or more columns that are the participants in the hierarchical relationship. Each level may have more than one key.

One of the levels in the list structure 304 may be a base level. Columns selected for the base level provide data at the finest granularity. One of the levels in the list structure 304 may be a totals or root level. Columns selected for the totals level provide data at the highest granular level. For example, the totals level may include a field that calculates the sum of each row within a single column of the entire data set (i.e., not partitioned by any other column).

The GUI 202 may enable a user to drag and drop columns (column A 306A, column B 306B, column C 306C, column D 306D, column E 306E, column F 306F) into the list structure 304. The order of the list structure 304 may specify the hierarchy of the columns relative to one another. A user may be able to drag and drop the columns in the list structure 304 at any time to redefine the hierarchical relationship between columns. The hierarchical relationship defined using the columns selected as keys in the list structure 304 may be utilized in charts such that drilling down (e.g., double click on a bar), enables a new chart to be generated based on a level lower in the hierarchy.

The GUI 202 may also include a mechanism for a user to request a table from a database to be presented as a worksheet in the GUI 202. Such a mechanism may be part of the interactivity of the worksheet. Specifically, a user may manipulate a worksheet (e.g., by dragging and dropping columns or rows, resorting columns or rows, etc.) and, in response, the GUI 202 may generate a request (e.g., in the form of a state specification) for a data set and send the request to the table manager 126. Such a mechanism may also include a direct identification of the rows and columns of a database table that a user would like to access (e.g., via a selection of the rows and columns in a dialog box). The GUI 202 may also include a mechanism for a user to create a new table on the database, add rows to a table, and move rows within the table.

Figure 4:
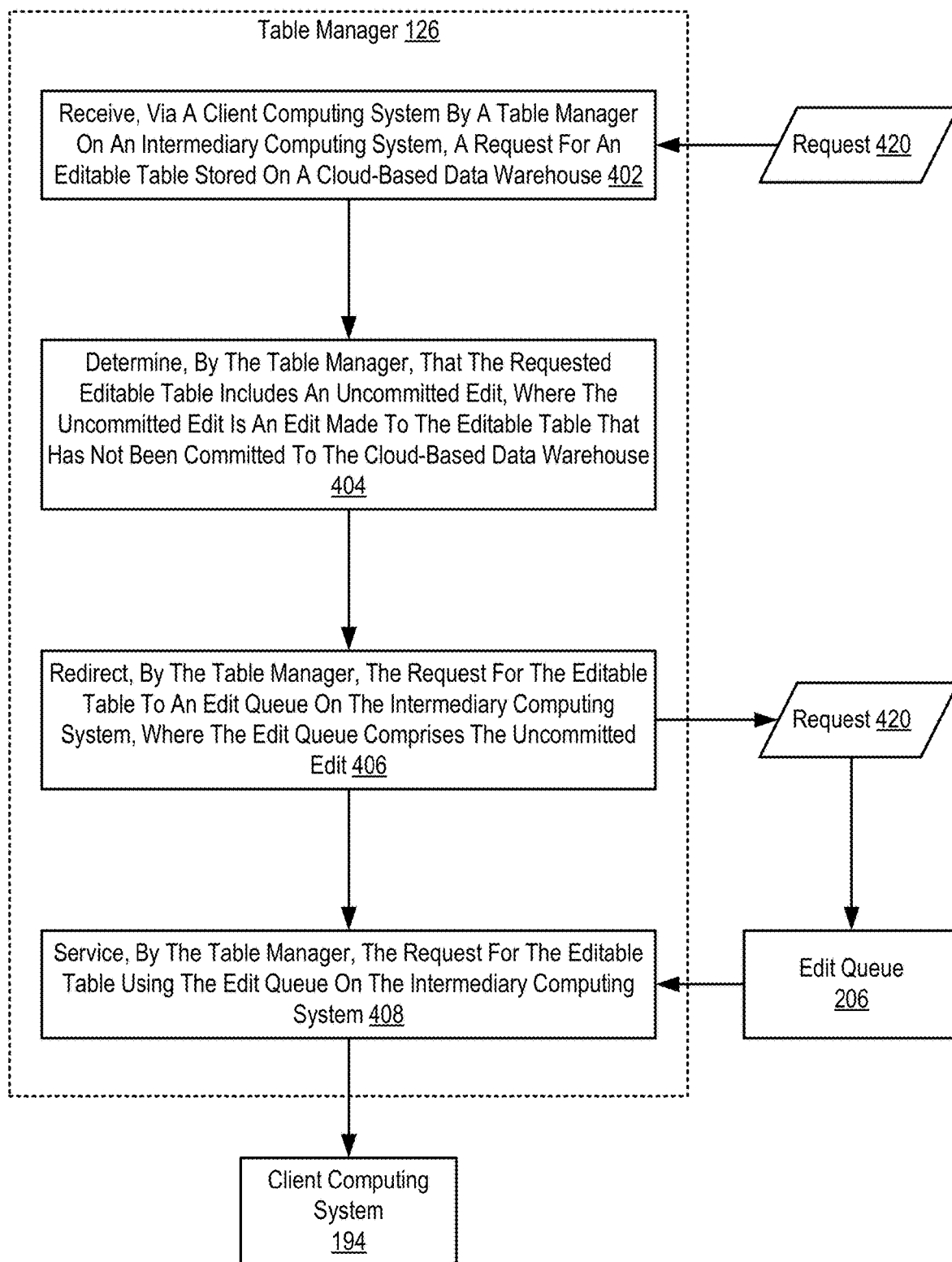
FIG. 4 sets forth a flow chart illustrating an exemplary method for live editing editable tables according to embodiments of the present invention.

For further explanation, FIG. 4 sets forth a flow chart illustrating an exemplary method for live editing editable tables according to embodiments of the present invention that includes receiving 402, via a client computing system by a table manager 126 on an intermediary computing system, a request 420 for an editable table stored on a cloud-based data warehouse. Receiving 402 the request 420 for an editable table stored on a cloud-based data warehouse may be carried out by detecting that a user has manipulated elements of the GUI and/or submitted data using the GUI such that the generation of the request 420 is triggered, and the request 420 is sent to the table manager 126.

The editable table is a table on the cloud-based data warehouse 192 requested by a user of the client computing system. The editable table may be any table on the cloud-base data warehouse that the user and/or the table manager has authorization to edit. The editable table may also be a table that the user and/or the table manager does not have authorization to edit or does not desire to edit, but may be added to using a companion table. The editable table may include any number of columns and rows. When presented on the GUI on the client computing system, only a portion of the columns and rows may be displayed while others are hidden and not presented.

The request 420 may be received in the form of a state specification from the GUI. Specifically, each change to the GUI may result in a new or updated state specification that operates as an instruction to the table manager 126. The request for the editable table may be in response to a table request made through the GUI. For example, a user of the client computing system may select the editable table from a group of tables presented for display on the GUI.

The request 420 may be for a portion of the editable table. A request for a portion of the editable table may originate with the user desiring to present only a portion of the editable table. Alternatively, the request for a portion of the editable table may be the result of the table manager 126 detecting that only a portion of the requested editable table is currently viewable in the GUI. Because only a portion of the requested editable table is viewable in the GUI, to maintain efficiency, the table manager 126 may modify the request to only request the viewable portion of the editable table.

The method of FIG. 4 also includes determining 404, by the table manager 126, that the requested editable table includes an uncommitted edit, wherein the uncommitted edit is an edit made to the editable table that has not been committed to the cloud-based data warehouse. Determining 404 that the requested editable table includes an uncommitted edit may be carried out by examining the rows and columns in the request 420 and comparing the rows and columns to the rows and columns in the edit queue 206. The table manager 126 may only evaluate the most recent edit in the edit queue for a particular row and column. If multiple edits have been made to the same row and column, only the most recent need be reflected in the requested editable table.

Multiple users may be concurrently editing the editable table, and the request 420 may be received from a first user on a first client computing system and the uncommitted edit may have been made by a second user on a second client computing system. The edits made by the second user are reflected on the GUI of the first user's computing system. Therefore, in servicing a request from the first user, all edits made by all other users are accounted for in presenting the editable table to the first user.

If the request 420 is for only a portion of the editable table, determining 404 that the requested editable table includes an uncommitted edit may include determining that the uncommitted edit is within the requested portion of the editable table. Specifically, the table manger 126 may only evaluate the edits in the edit queue 206 that are within the portion of the editable table in the request 420. Other edits outside the portion of the editable table may be ignored.

The method of FIG. 4 also includes redirecting 406, by the table manager 126, the request 420 for the editable table to an edit queue 206 on the intermediary computing system, wherein the edit queue 206 comprises the uncommitted edit. Redirecting 406 the request 420 for the editable table to an edit queue 206 on the intermediary computing system may be carried out by directing the request 420 to the edit queue 206 instead of processing the request 420 into a database query and sending the database query to the cloud-base data warehouse. Because the edit queue 206 includes edits that affect the presentation of the editable table on the client computing system, simply retrieving the editable table from the cloud-based data warehouse would not reflect the current state of the editable table. By redirecting the request 420 first to the edit queue 206 instead of directly to the cloud-based data warehouse storing the editable table, the edits that have been recently made but uncommitted to the cloud-based data warehouse may be presented to the user requesting the editable table.

The method of FIG. 4 also includes servicing 408, by the table manager 126, the request 420 for the editable table using the edit queue 206 on the intermediary computing system. Servicing 408 the request 420 for the editable table using the edit queue 206 may be carried out by retrieving the uncommitted edits from the edit queue 206, retrieving the current version of the editable table (that lacks the uncommitted edits from the edit queue 206), and joining, merging, unioning, or otherwise combining the uncommitted edits and the editable table together. Servicing 408 the request 420 for the editable table using the edit queue 206 may be carried out by presenting the editable table with the uncommitted edit via a GUI on the client computing system.

The above limitations improve the operation of the computer system by presenting a current version of an editable table from a database on a cloud-based data warehouse that includes edits made to the editable table before the edits are committed by the database on a cloud-based data warehouse. This is accomplished by redirecting requests for the editable table to an edit queue that includes uncommitted edits to the editable table and adding the uncommitted edits to the editable table on the cloud-based data warehouse. Incorporating the uncommitted edits into the query statement generation reduces the user-perceived latency of making the edit; the actual latency for the cloud-based data warehouse to commit the edit may be much higher than the user perceives.

Figure 5:
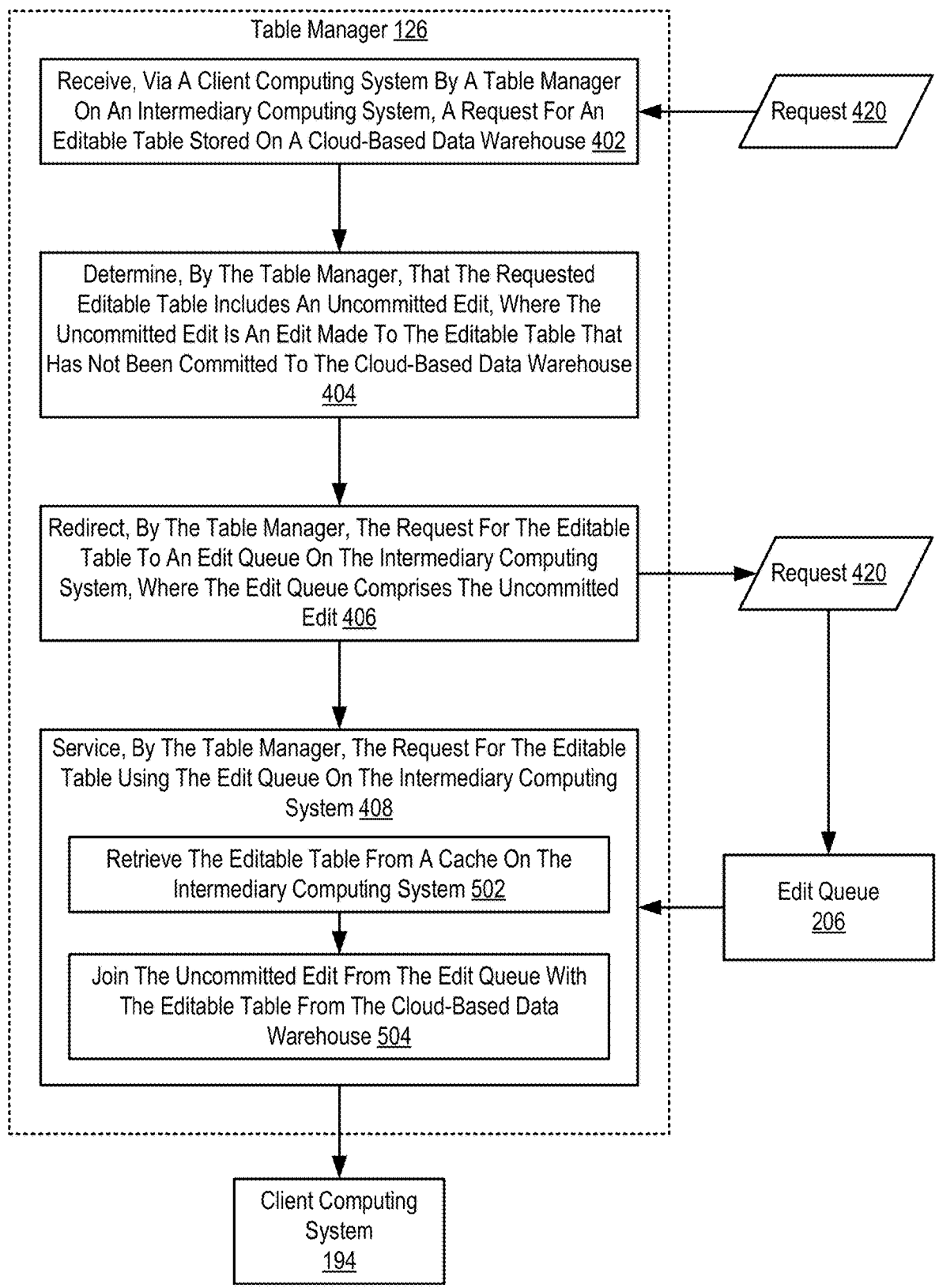
FIG. 5 sets forth a flow chart illustrating an exemplary method for live editing editable tables according to embodiments of the present invention.

For further explanation, FIG. 5 sets forth a flow chart illustrating a further exemplary method for live editing editable tables according to embodiments of the present invention that includes receiving 402, via a client computing system by a table manager 126 on an intermediary computing system, a request 420 for an editable table stored on a cloud-based data warehouse; determining 404, by the table manager 126, that the requested editable table includes an uncommitted edit, wherein the uncommitted edit is an edit made to the editable table that has not been committed to the cloud-based data warehouse; redirecting 406, by the table manager 126, the request 420 for the editable table to an edit queue 206 on the intermediary computing system, wherein the edit queue 206 comprises the uncommitted edit; and servicing 408, by the table manager 126, the request 420 for the editable table using the edit queue 206 on the intermediary computing system.

The method of FIG. 5 differs from the method of FIG. 4, however, in that servicing 408, by the table manager 126, the request 420 for the editable table using the edit queue 206 on the intermediary computing system includes retrieving 502 the editable table from a cache on the intermediary computing system; and joining 504 the uncommitted edit from the edit queue 206 with the editable table from the cloud-based data warehouse.

Retrieving 502 the editable table from a cache on the intermediary computing system may be carried out by searching the cache for a version of the editable table appropriate to combine with the uncommitted edits from the edit queue 206 to generate an up-to-date version of the editable table. An appropriate version of the editable table in the cache may be a version of the editable table that includes all commitment acknowledgments received by the table manager 126. The editable table may have been placed in the cache after receiving the editable table as a query results from a database statement send to the cloud-based data warehouse. Retrieving 502 the editable table from a cache may include instructing a query compiler to retrieve the editable table from the cache.

Joining 504 the uncommitted edit from the edit queue 206 with the editable table from the cloud-based data warehouse may be carried out by joining, merging, unioning, or otherwise combining the uncommitted edit and the editable table together. Joining 504 the uncommitted edit from the edit queue 206 with the editable table may include applying the uncommitted edits to the version of the editable table retrieved from the cache to generate the current, up-to-date version of the editable table.

Figure 6:
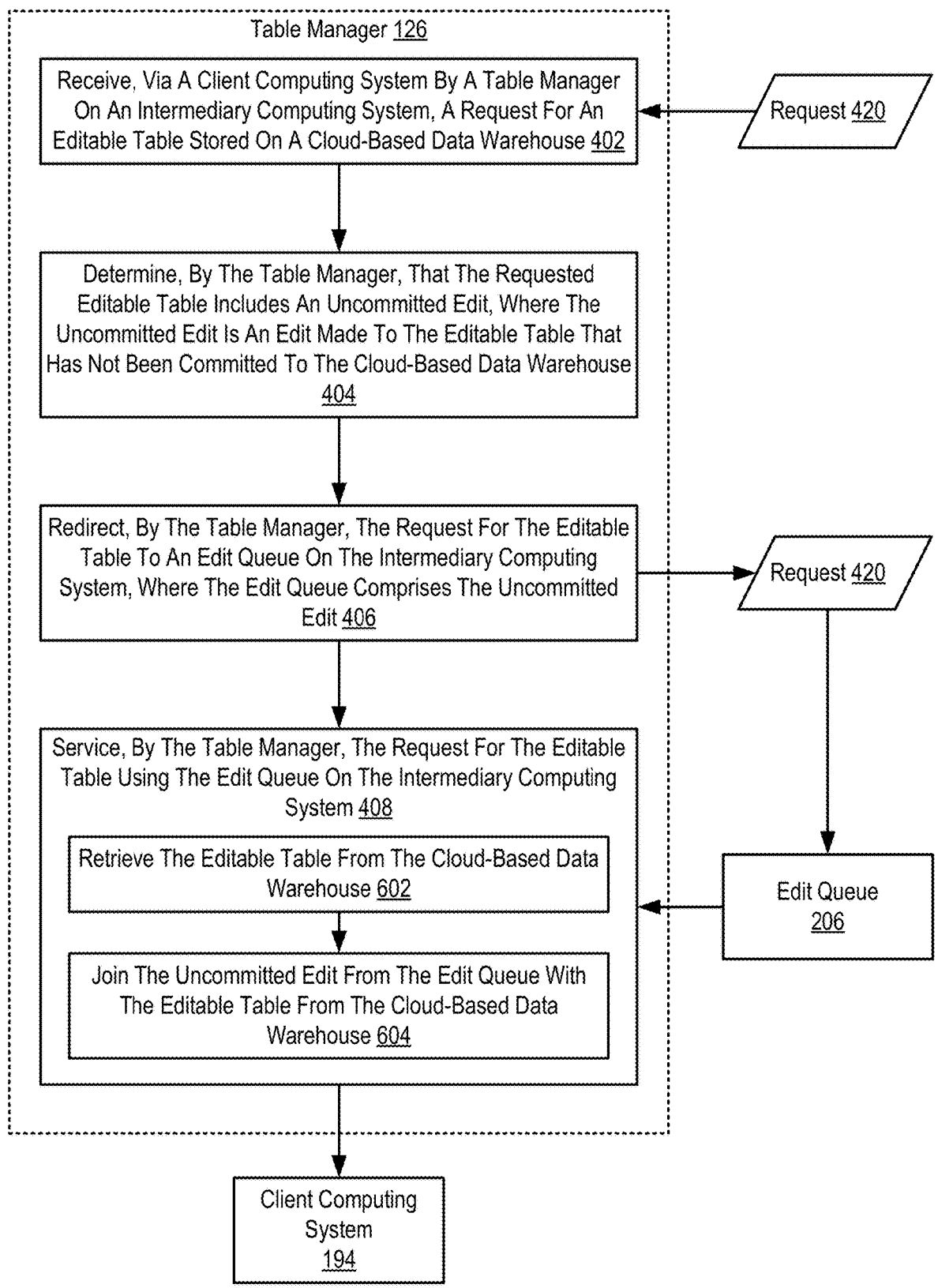
FIG. 6 sets forth a flow chart illustrating an exemplary method for live editing editable tables according to embodiments of the present invention.

For further explanation, FIG. 6 sets forth a flow chart illustrating a further exemplary method for live editing editable tables according to embodiments of the present invention that includes receiving 402, via a client computing system by a table manager 126 on an intermediary computing system, a request 420 for an editable table stored on a cloud-based data warehouse; determining 404, by the table manager 126, that the requested editable table includes an uncommitted edit, wherein the uncommitted edit is an edit made to the editable table that has not been committed to the cloud-based data warehouse; redirecting 406, by the table manager 126, the request 420 for the editable table to an edit queue 206 on the intermediary computing system, wherein the edit queue 206 comprises the uncommitted edit; and servicing 408, by the table manager 126, the request 420 for the editable table using the edit queue 206 on the intermediary computing system.

The method of FIG. 6 differs from the method of FIG. 4, however, in that servicing 408, by the table manager 126, the request 420 for the editable table using the edit queue 206 on the intermediary computing system includes retrieving 602 the editable table from the cloud-based data warehouse; and joining 604 the uncommitted edit from the edit queue 206 with the editable table from the cloud-based data warehouse.

Retrieving 602 the editable table from the cloud-based data warehouse may be carried out by sending a database statement targeting the cloud-based data warehouse; and receiving, form the cloud-based data warehouse, query results in response to the database statement, wherein the query results comprise the editable table. Sending the database statement targeting the cloud-based data warehouse may include generating the database statement from at least a portion of the request 420, including lowering the request into the various intermediate forms discussed above. The resulting database statement may be a structured query language statement. Once generated, the database statement may then be submitted to the cloud-based data warehouse. Receiving, from the cloud-based data warehouse, query results in response to the database statement may include detecting that the query results for the database statement have been sent from the cloud-based data warehouse and received by the table manager 126. Retrieving 602 the editable table from the cloud-based data warehouse may include instructing the query compiler to retrieve the editable table from the cloud-based data warehouse.

Joining 604 the uncommitted edit from the edit queue 206 with the editable table from the cloud-based data warehouse may be carried out by joining, merging, unioning, or otherwise combining the uncommitted edit and the editable table together. Joining 504 the uncommitted edit from the edit queue 206 with the editable table from the cloud-based data warehouse may include applying the uncommitted edits to the version of the editable table retrieved from the cloud-based data warehouse to generate the current, up-to-date version of the editable table.

In view of the explanations set forth above, readers will recognize that the benefits of live editing editable tables according to embodiments of the present invention include:
  Improving the operation of the computer system by presenting a current version of an editable table from a database on a cloud-based data warehouse that includes edits made to the editable table before the edits are committed by the database on a cloud-based data warehouse, increasing system responsiveness.
  Improving the operation of a computing system by redirecting requests for the editable table to an edit queue that includes uncommitted edits to the editable table, increasing system collaborative utility.
  Improving the operation of a computing system by adding the uncommitted edits to the editable table on the cloud-based data warehouse, increasing system utility.

Exemplary embodiments of the present invention are described largely in the context of a fully functional computer system for live editing editable tables. Readers of skill in the art will recognize, however, that the present invention also may be embodied in a computer program product disposed upon computer readable storage media for use with any suitable data processing system. Such computer readable storage media may be any storage medium for machine-readable information, including magnetic media, optical media, or other suitable media. Examples of such media include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the exemplary embodiments described in this specification are oriented to software installed and executing on computer hardware, nevertheless, alternative embodiments implemented as firmware or as hardware are well within the scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. A method for live editing editable tables, the method comprising:
    receiving, via a client computing system by a table manager on an intermediary computing system, a request for an editable table stored on a cloud-based data warehouse;
    determining, by the table manager, that an uncommitted edit to the editable table exists, wherein the uncommitted edit is an edit made to the editable table that has not been committed to the cloud-based data warehouse at a time when the request was received;
    in response to the determination, before servicing the request, first redirecting, by the table manager, the request for the editable table to an edit queue on the intermediary computing system instead of processing the request into a query for the cloud-based data warehouse, wherein the edit queue the uncommitted edit;
    after the request is redirected, servicing by the table manager, the request for the editable table by combining the uncommitted edit from the edit queue from the intermediary computing system with the editable table from the cloud-based data warehouse; and
    presenting, by the table manager, the editable table on the client computing system.

2. The method of claim 1, wherein servicing the request for the editable table using the edit queue further comprises retrieving the editable table from a cache on the intermediary computing system.

3. The method of claim 1, wherein servicing the request for the editable table using the edit queue further comprises retrieving the editable table from the cloud-based data warehouse.

4. The method of claim 3, wherein retrieving the editable table from the cloud-based data warehouse comprises:
    sending a database statement targeting the cloud-based data warehouse; and
    receiving, from the cloud-based data warehouse, query results in response to the database statement, wherein the query results comprise the editable table.

5. The method of claim 4, wherein the database statement is a structured query language statement.

6. The method of claim 1, wherein servicing the request for the editable table using the edit queue comprises presenting the editable table with the uncommitted edit on the client computing system.

7. The method of claim 1, wherein the uncommitted edit is held in the edit queue until a commitment acknowledgement for the uncommitted edit is received from the cloud-based data warehouse.

8. The method of claim 1, wherein the request is received from a first user on a first client computing system, and wherein the uncommitted edit was received from a second user on a second client computing system.

9. The method of claim 1, wherein the request for the editable table is a request for a portion of the editable table, and wherein determining, by the table manager, that the requested editable table includes the uncommitted edit comprises determining that the uncommitted edit is within the requested portion of the editable table.

10. An apparatus for live editing editable tables, the apparatus comprising a computer processor, a computer memory operatively coupled to the computer processor, the computer memory having disposed within it computer program instructions that, when executed by the computer processor, cause the apparatus to carry out:
- receiving, via a client computing system by a table manager on an intermediary computing system, a request for an editable table stored on a cloud-based data warehouse;
- determining, by the table manager, that an uncommitted edit to the editable table exists, wherein the uncommitted edit is an edit made to the editable table that has not been committed to the cloud-based data warehouse at a time when the request was received;
- in response to the determination, before servicing the request, first redirecting, by the table manager, the request for the editable table to an edit queue on the intermediary computing system instead of processing the request into a query for the cloud-based data warehouse, wherein the edit queue comprises the uncommitted edit;
- after the request is redirected, servicing by the table manager, the request for the editable table by combining the uncommitted edit from the edit queue from the intermediary computing system with the editable table from the cloud-based data warehouse; and
- presenting, by the table manager, the editable table on the client computing system.

11. The apparatus of claim 10, wherein servicing the request for the editable table using the edit queue further comprises retrieving the editable table from a cache on the intermediary computing system.

12. The apparatus of claim 10, wherein servicing the request for the editable table using the edit queue further comprises retrieving the editable table from the cloud-based data warehouse.

13. The apparatus of claim 12, wherein retrieving the editable table from the cloud-based data warehouse comprises:
- sending a database statement targeting the cloud-based data warehouse; and
- receiving, from the cloud-based data warehouse, query results in response to the database statement, wherein the query results comprise the editable table.

14. The apparatus of claim 10, wherein servicing the request for the editable table using the edit queue comprises presenting the editable table with the uncommitted edit on the client computing system.

15. The apparatus of claim 10, wherein the uncommitted edit is held in the edit queue until a commitment acknowledgement for the uncommitted edit is received from the cloud-based data warehouse.

16. The apparatus of claim 10, wherein the request is received from a first user on a first client computing system, and wherein the uncommitted edit was received from a second user on a second client computing system.

17. The apparatus of claim 10, wherein the request for the editable table is a request for a portion of the editable table, and wherein determining, by the table manager, that the requested editable table includes the uncommitted edit comprises determining that the uncommitted edit is within the requested portion of the editable table.

18. A computer program product for live editing editable tables, the computer program product comprising a non-transitory computer readable storage medium, the computer program product comprising computer program instructions that, when executed, cause a computer to carry out:
- receiving, via a client computing system by a table manager on an intermediary computing system, a request for an editable table stored on a cloud-based data warehouse;
- determining, by the table manager, that an uncommitted edit to the editable table exists, wherein the uncommitted edit is an edit made to the editable table that has not been committed to the cloud-based data warehouse at a time when the request was received;
- in response to the determination, before servicing the request, first redirecting, by the table manager, the request for the editable table to an edit queue on the intermediary computing system instead of processing the request into a query for the cloud-based data warehouse, wherein the edit queue comprises the uncommitted edit;
- after the request is redirected, servicing by the table manager, the request for the editable table by combining the uncommitted edit from the edit queue from the intermediary computing system with the editable table from the cloud-based data warehouse; and
- presenting, by the table manager, the editable table on the client computing system.

* * * * *